US008451517B2

(12) United States Patent
Peng et al.

(10) Patent No.: US 8,451,517 B2
(45) Date of Patent: May 28, 2013

(54) CALIBRATING AND POSITIONING STRUCTURE OF SCANNING APPARATUS

(75) Inventors: Te-Chen Peng, Taoyuan Hsien (TW); Li-Ju Huang, Taoyuan Hsien (TW)

(73) Assignee: TECO Image System Co., Ltd., Taoyuan Hsien (TW)

( * ) Notice: Subject to any disclaimer, the term of this patent is extended or adjusted under 35 U.S.C. 154(b) by 334 days.

(21) Appl. No.: 12/910,887

(22) Filed: Oct. 25, 2010

(65) Prior Publication Data

US 2012/0026557 A1 Feb. 2, 2012

(30) Foreign Application Priority Data

Jul. 27, 2010 (TW) ............................... 99124798 A

(51) Int. Cl.
*H04N 1/04* (2006.01)

(52) U.S. Cl.
USPC ............ 358/497; 358/406; 358/474; 358/486

(58) Field of Classification Search
USPC .................. 358/497, 406, 474, 486, 494, 504
See application file for complete search history.

(56) References Cited

U.S. PATENT DOCUMENTS

2009/0219587 A1* 9/2009 Weng et al. .................. 358/497

* cited by examiner

*Primary Examiner* — Houshang Safaipour

(57) ABSTRACT

A calibrating and positioning structure of a scanning apparatus is provided. The scanning apparatus includes a scanning platform and a scanning window. The scanning window has a wide edge. The calibrating and positioning structure includes a calibrating part and at least one positioning part. The calibrating part is disposed on the scanning platform, and aligned with the wide edge of the scanning window. The at least one positioning part is partially overlapped with the calibrating part, wherein the positioning part is not aligned with the wide edge of the scanning window.

17 Claims, 7 Drawing Sheets

CALIBRATING AND POSITIONING STRUCTURE OF SCANNING APPARATUS

CLAIM OF PRIORITY

This application claims priority to Taiwanese Patent Application No. 099124798 filed on Jul. 27, 2010.

FIELD OF THE INVENTION

The present invention relates to a calibrating and positioning structure, and more particularly to a calibrating and positioning structure of a scanning apparatus.

BACKGROUND OF THE INVENTION

Nowadays, scanning apparatuses such as multifunction peripherals or image scanners become essential electronic devices in the office or home. The scanning apparatuses are widely used for scanning images of documents, photographs or films. The scanned images can be converted into electronic files, which are then stored, processed, spread or modified. With increasing development of scanning technologies, the scanners are designed in views of miniaturization, good imaging quality and cost-effectiveness.

Generally, after a scanning apparatus is turned on, a warm-up activity is performed by the scanner. During the warm-up period, a calibrating operation is performed on a calibration plate to acquire standard image data. The standard image data are used as reference basis for correcting and compensating the systematic color level. In other words, the calibrating operation may compensate the color shift of the scanned image and correct the starting position of the scanning range of the scanner.

FIG. 1 is a schematic view illustrating a scanning apparatus with a position-calibrating structure according to the prior art. As shown in FIG. 1, the conventional scanning apparatus 1 has a scanning platform 10. A position-calibrating structure 101 is disposed on the scanning platform 10. A scanning module 102 is disposed under the scanning platform 10. In addition, the scanning platform 10 has a scanning window 103. In a case that the scanning module 102 is located at the starting position of the scanning range, the position-calibrating structure 101 is arranged between the scanning module 102 and the scanning window 103.

The position-calibrating structure 101 comprises a pair of color plates with strong color contrast. For example, the position-calibrating structure 101 comprises a white calibration plate 101*a* and a black calibration plate 101*b*. The white calibration plate 101*a* is disposed on the scanning platform 10. The black calibration plate 101*b* is arranged beside the scanning window 103, and aligned with and partially overlapped with the white calibration plate 101*a*. In addition, a light-emitting element (not shown) and an image reader (not shown) are disposed within the scanning module 102. A document 104 to be scanned is placed on the scanning window 103. A light beam emitted from the light-emitting element is projected on the document 104, and the reflected light beam is received by the image reader within the scanning module 102. As a consequence, the image data of the document 104 are obtained and saved as an electronic file.

For performing a position-calibrating operation of the scanning module 102, the scanning module 102 is moved in a scanning direction B. When the scanning module 102 is moved to the position corresponding to the white calibration plate 101*a* of the position-calibrating structure 101, the light beam emitted from the light-emitting element is reflected by the white calibration plate 101*a* and then received by the image reader. Meanwhile, a color level correction is performed. Then, the scanning module 102 is continuously moved in a scanning direction B to the position corresponding to the black calibration plate 101*b* of the position-calibrating structure 101. According to the color contrast between the white calibration plate 101*a* and the black calibration plate 101*b* when the scanning module 102 is moved from the white calibration plate 101*a* to the black calibration plate 101*b*, a sensing voltage difference is detected to judge the starting position of the scanning range of the scanning module.

The use of the position-calibrating structure 101, however, still has some drawbacks. For example, when the scanning module 102 is moved to the junction between the white calibration plate 101*a* and the black calibration plate 101*b*, the sensing voltage is unstable and the transition region fluctuates (see the circled zone 22 as shown in FIG. 2). In this situation, the data for color level calibration are insufficient (see the circled zone 21 as shown in FIG. 2). The image reader within the scanning module 102 may be suffered from erroneous judgment, so that the accuracy of the color level calibration is usually unsatisfied. Moreover, if the document 104 is similar to the position-calibrating structure 101, the scanning module 102 may erroneously judge the starting position of the scanning range. In this situation, the accuracy of the color level calibration and the accuracy of positioning the starting position of the scanning range will be impaired and thus the imaging quality of the scanned image will be deteriorated.

FIG. 3 is a schematic view illustrating another scanning apparatus with a position-calibrating structure according to the prior art. As shown in FIG. 3, the position-calibrating structure 101 comprises a white calibration plate 101*a* and a home sensor 101*c*. For performing a position-calibrating operation of the scanning module 102, the scanning module 102 is moved in a scanning direction B. When the scanning module 102 is moved to the position corresponding to the home sensor 101*c*, the home sensor 101*c* issues a notifying signal to prompt the starting position of the scanning module 102.

Although the uses of the white calibration plate 101*a* and the home sensor 101*c* are effective for correcting the starting position and the color level, the home sensor 101*c* increases the fabricating cost of the scanning apparatus 1.

For obviating the drawbacks encountered from the prior art, there is a need of providing a calibrating and positioning structure of a scanning apparatus.

SUMMARY OF THE INVENTION

The present invention provides a calibrating and positioning structure of a scanning apparatus for perform a color level calibration and determining a starting position of the scanning range without obvious in order to acquire a flat transition region of the sensing voltage curve and increase the imaging quality of the scanned image.

In accordance with an aspect of the present invention, there is provided a calibrating and positioning structure of a scanning apparatus. The scanning apparatus includes a scanning platform and a scanning window. The scanning window has a wide edge. The calibrating and positioning structure includes a calibrating part and at least one positioning part. The calibrating part is disposed on the scanning platform, and aligned with the wide edge of the scanning window. The at least one positioning part is partially overlapped with the calibrating part, wherein the positioning part is not aligned with the wide edge of the scanning window.

In accordance with another aspect of the present invention, there is provided a scanning apparatus. The scanning apparatus includes a scanning platform, a scanning window, a scanning module and a calibrating and positioning structure. The scanning window has a wide edge. The scanning module is used for scanning a document, which is placed on the scanning window. The calibrating and positioning structure includes a calibrating part and at least one positioning part. The calibrating part is disposed on the scanning platform and aligned with the wide edge of the scanning window. The positioning part is partially overlapped with the calibrating part, but not aligned with the wide edge of the scanning window.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
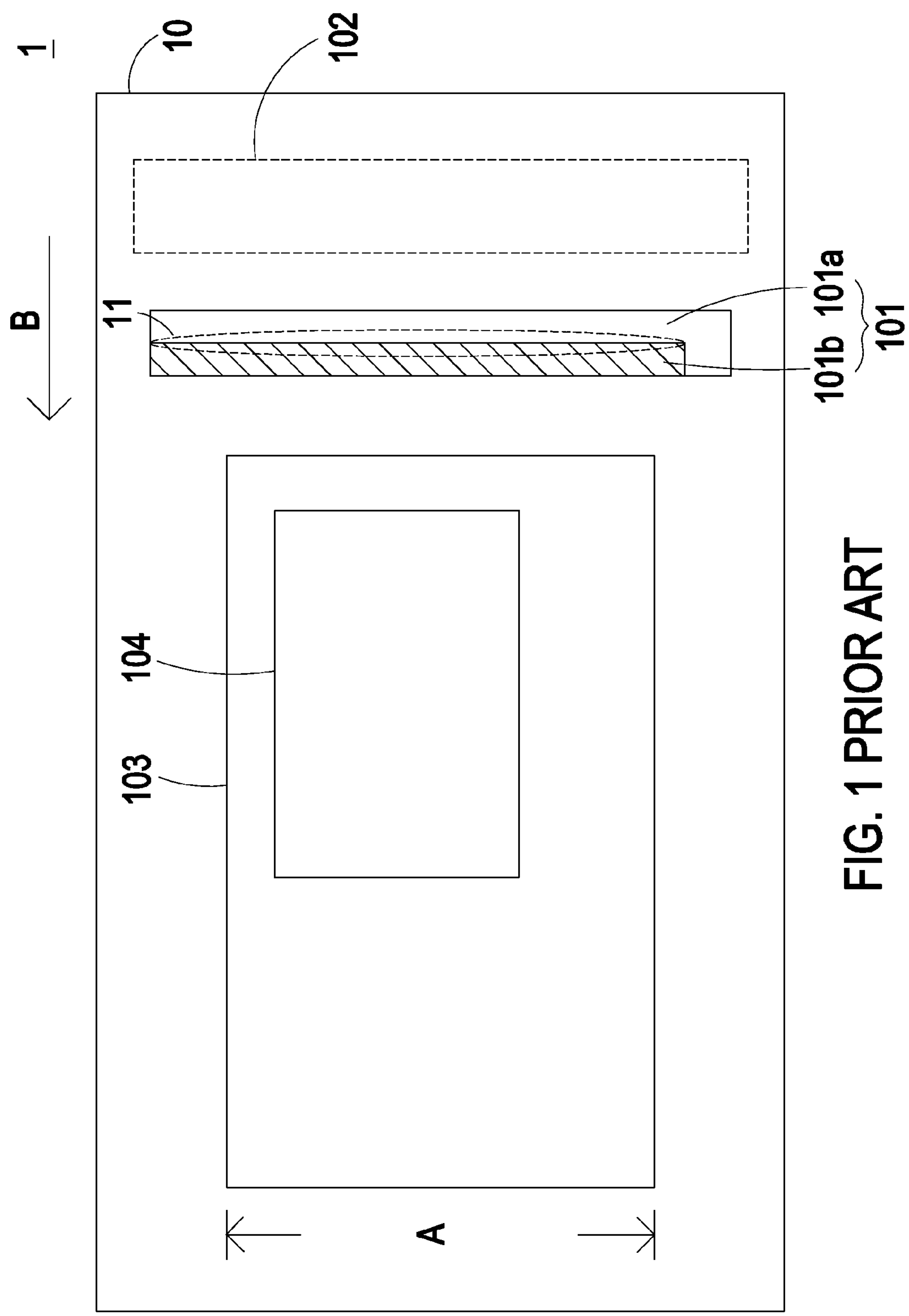
FIG. 1 is a schematic view illustrating a scanning apparatus with a position-calibrating structure according to the prior art.
Figure 2:
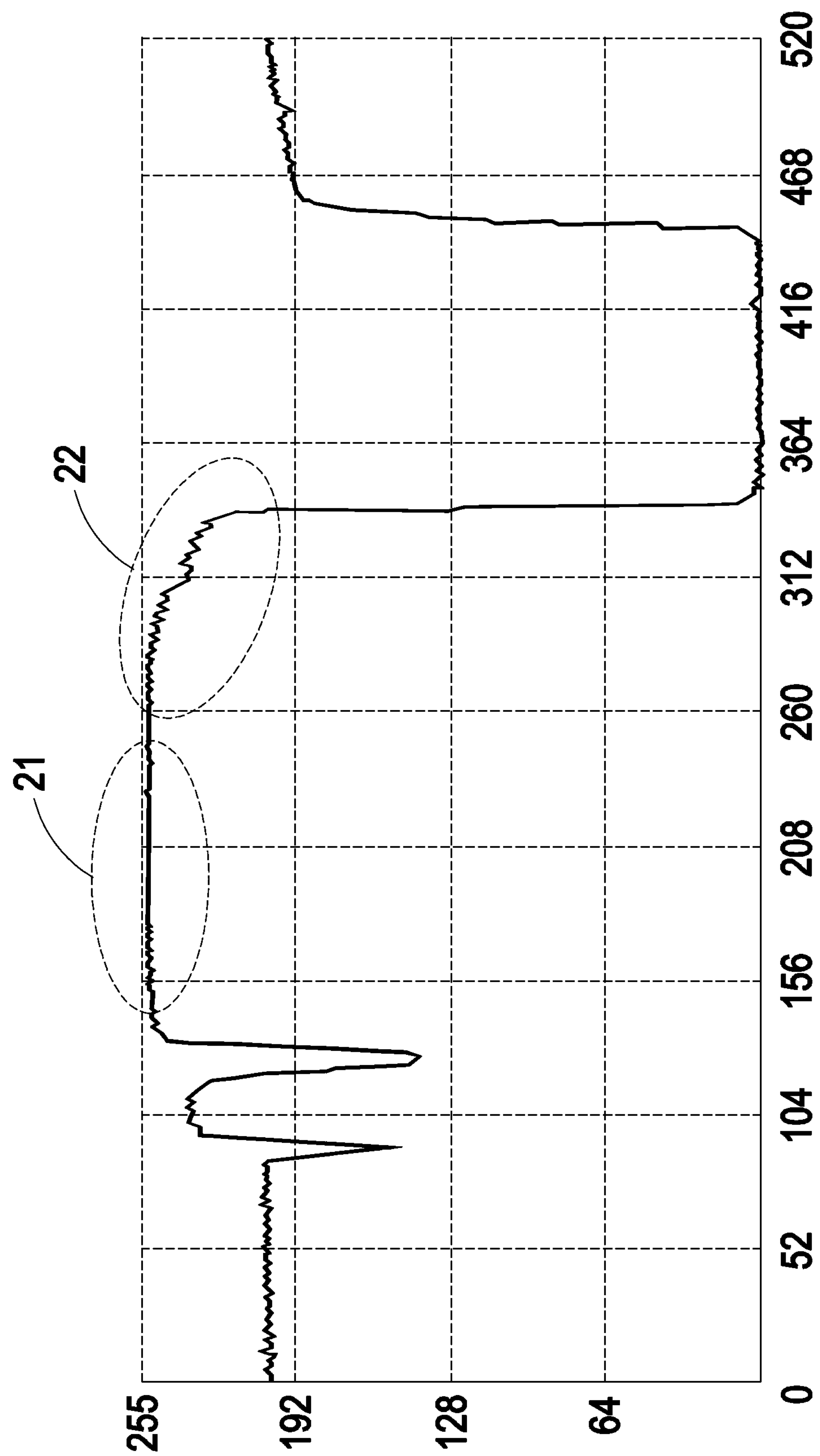
FIG. 2 is a plot illustrating the relation between the sensing voltage and the color level during a calibrating operation of a scanning apparatus is performed according to the prior art.
Figure 3:
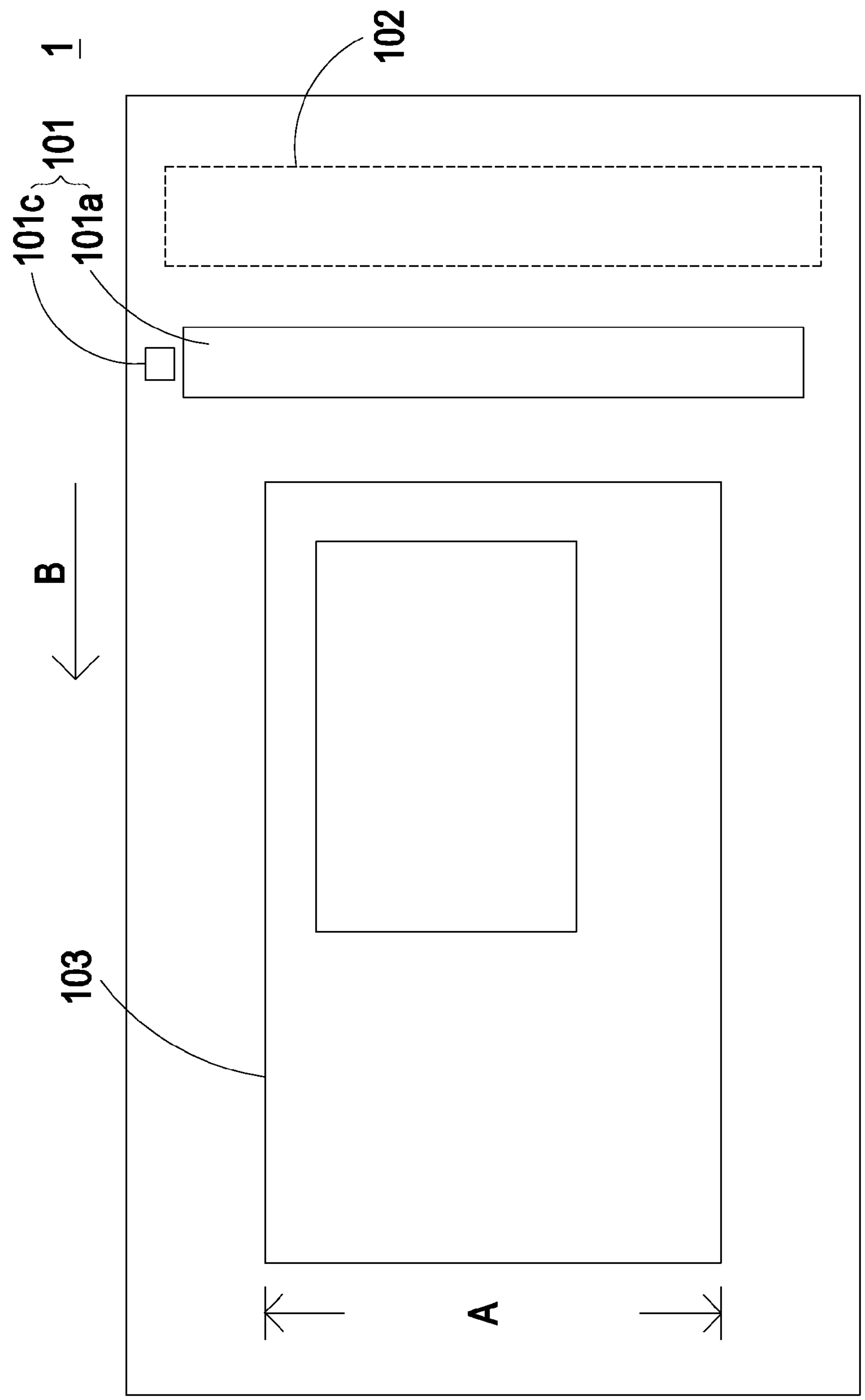
FIG. 3 is a schematic view illustrating another scanning apparatus with a position-calibrating structure according to the prior art.
Figure 4A:
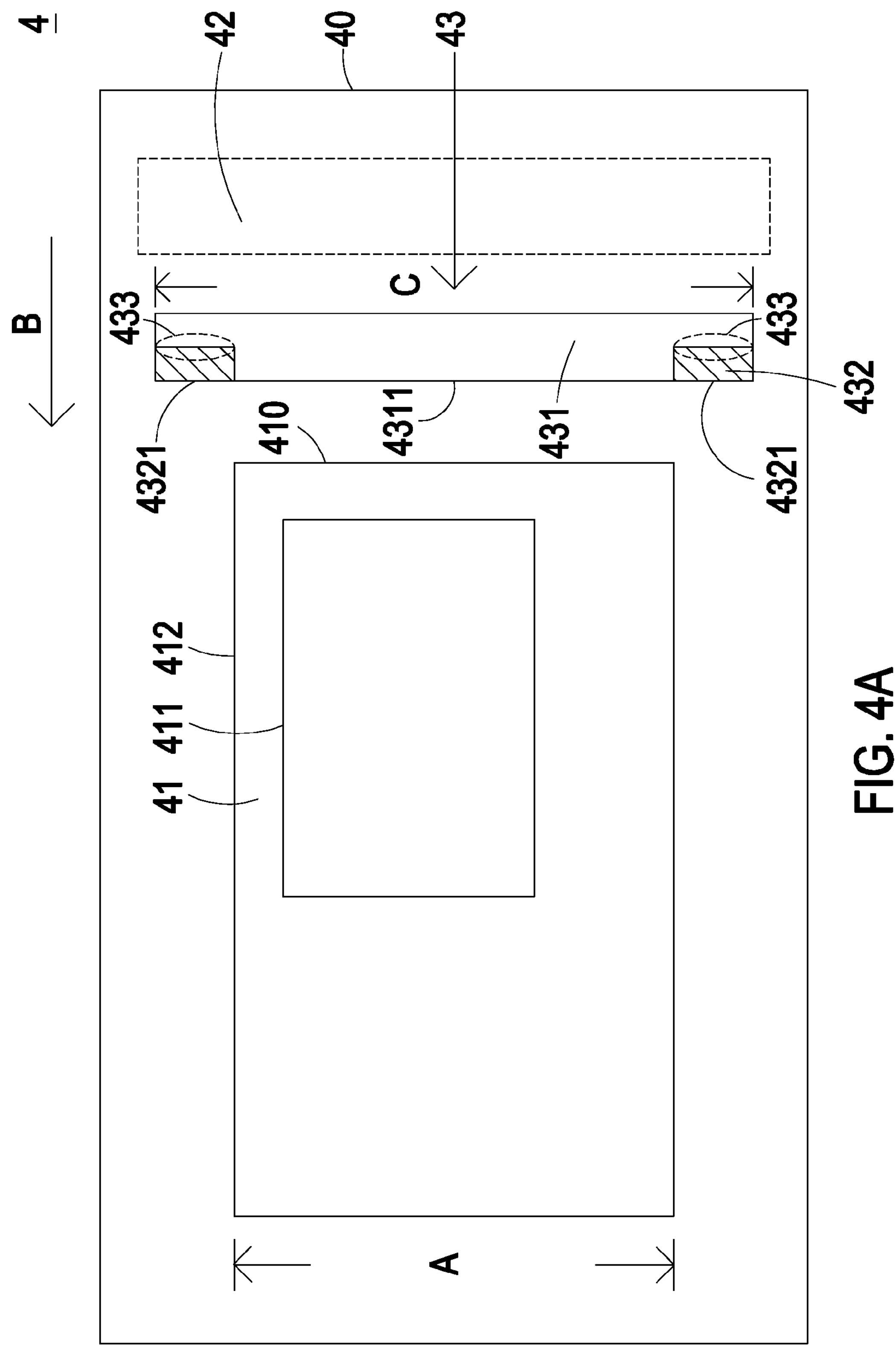
FIG. 4A is a schematic view illustrating a schematic view illustrating a scanning apparatus according to an embodiment of the present invention.

FIG. 4A is a schematic view illustrating a schematic view illustrating a scanning apparatus according to an embodiment of the present invention. An example of the scanning apparatus 4 includes but is not limited to an image scanner or a multifunction peripheral. As shown in FIG. 4A, the scanning apparatus 4 comprises a scanning platform 40, a scanning module 42 and a calibrating and positioning structure 43. The scanning platform 40 has a scanning window 41. The calibrating and positioning structure 43 is disposed on the scanning platform 40. The scanning module 42 is disposed under the scanning platform 40. A document 411 to be scanned is placed on the scanning window 41. The scanning window 41 has a wide edge 410, which is perpendicular to the scanning direction B of the scanning module 42 and has a width A. The scanning window 41 also has a length edge 412, which is parallel to the scanning direction B of the scanning module 42. In addition, a light-emitting element (not shown) and an image reader (not shown) are disposed within the scanning module 42. An example of the image reader includes but is not limited to a contact image sensor (CIS) or a charge coupled device (CCD). The image reader has a plurality of image picking-up elements arranged in array, and the image reader has a maximum scanning length larger than the length C of the calibrating and positioning structure 43. The calibrating and positioning structure 43 is arranged beside the scanning window 41, and parallel with the wide edge 410 of the scanning window 41.

Figure 4B:
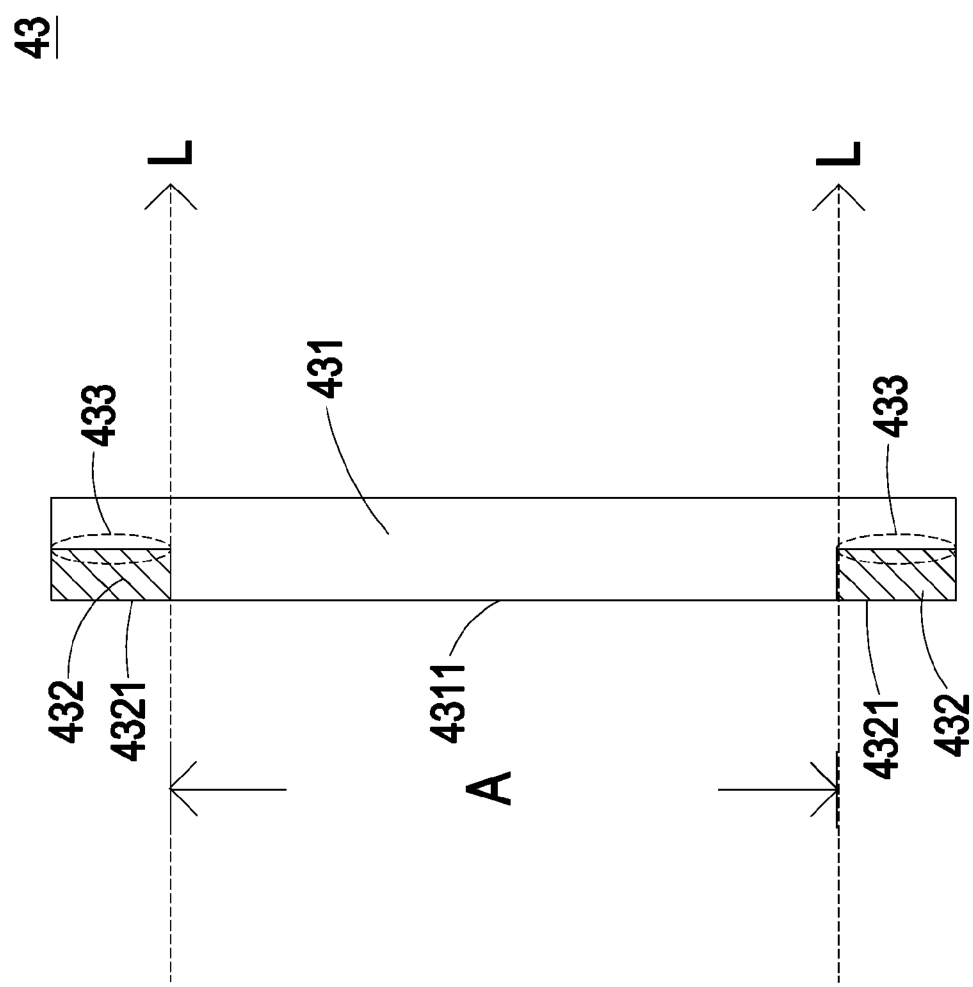
FIG. 4B is a schematic view illustrating the calibrating and positioning structure of the scanning apparatus as shown in FIG. 4A.

FIG. 4B is a schematic view illustrating the calibrating and positioning structure of the scanning apparatus as shown in FIG. 4A. The calibrating and positioning structure 43 is an elongated plate, which is printed or attached on the scanning platform 40 of the scanning apparatus 4. The calibrating and positioning structure 43 comprises a calibrating part 431 and at least one positioning part 432. In this embodiment, the calibrating and positioning structure 43 comprises a calibrating part 431 and two positioning parts 432. The two positioning parts 432 are respectively disposed at both ends of the calibrating part 431 and partially overlapped with the calibrating part 431. A first edge 4321 of the positioning part 432 and a first edge 4311 of the calibrating part 431 are arranged in the same line. In addition, the calibrating part 431 is arranged beside and aligned with the wide edge 410 of the scanning window 41, but the positioning parts 432 are not aligned with the wide edge 410 of the scanning window 41. The length edge 412 of the scanning window 41 has an extending line L extending outwardly and parallel to the scanning direction B of the scanning module 42. Each of the positioning parts 432 and the scanning window 41 are arranged on two opposite sides of the extending lines L. In this embodiment, the distance between the two positioning parts 432 is equal to the width A of the wide edge 410 of the scanning window 41. Moreover, the calibrating part 431 and the positioning part 432 are different color plates with strong color contrast. For example, the calibrating part 431 is a white calibration plate, and the positioning part 432 is a black calibration plate. In addition, there is a junction 433 between the calibrating part 431 and the positioning part 432.

For performing a position-calibrating operation of the scanning module 42, the scanning module 42 is moved in the scanning direction B. When the scanning module 42 is moved to the position corresponding to the calibrating part 431, the light beam emitted from the light-emitting element is reflected by the calibrating part 431 and then received by the image reader within the scanning module 42, thereby acquiring standard image data. The standard image data are used as reference basis for correcting and compensating the systematic color level. Then, the scanning module 42 is continuously moved in a scanning direction B to the position corresponding to the positioning part 432. When the scanning module 42 is moved across the junction 433 between the calibrating part 431 and the positioning part 432, the obvious color contrast between the calibrating part 431 and the positioning part 432 causes an abrupt change of a sensing voltage. According to the abrupt change of the sensing voltage, the starting position of the scanning range is determined.

Figure 5:
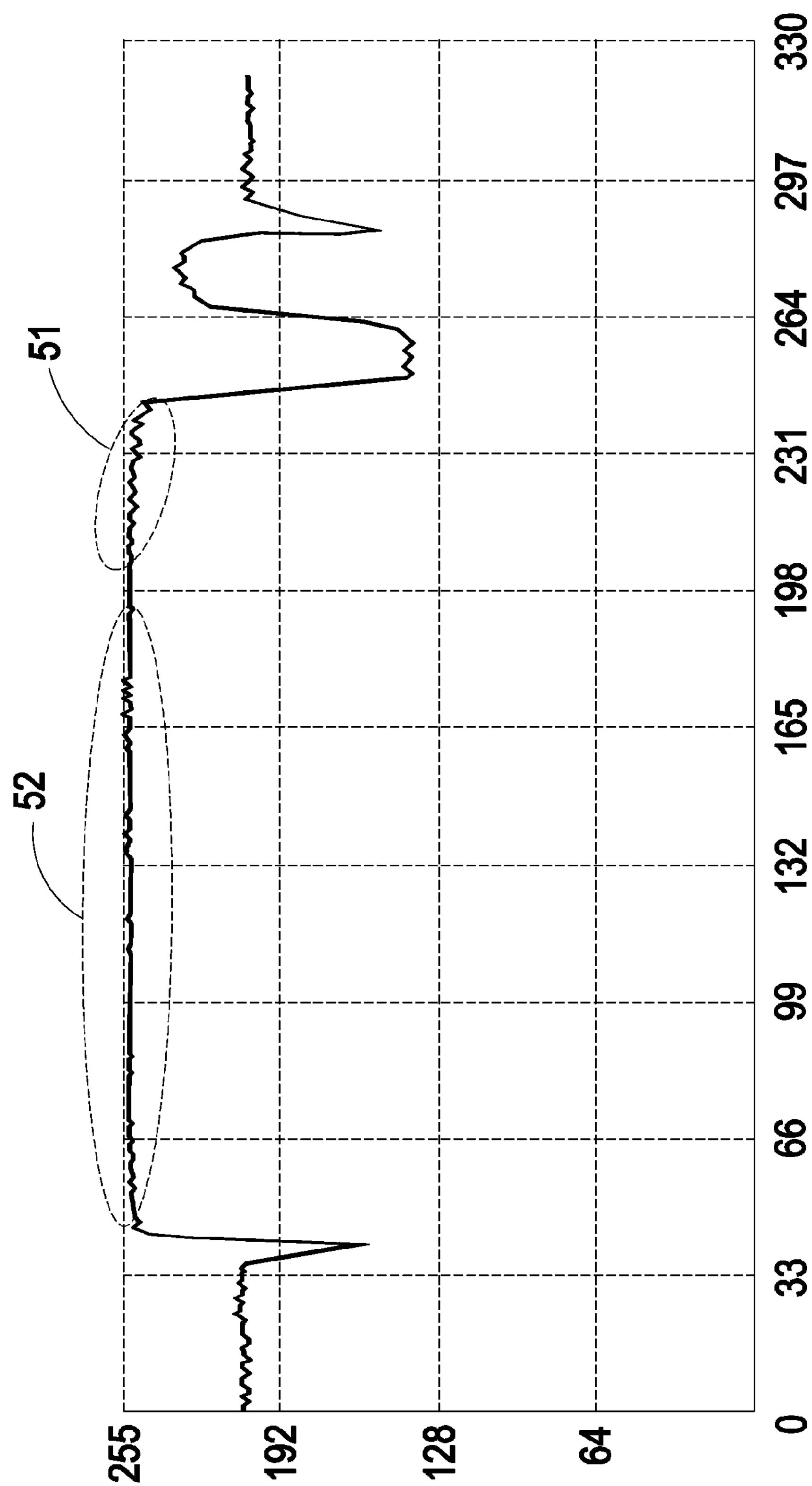
FIG. 5 is a plot illustrating the relation between the sensing voltage and the color level during a calibrating operation of a scanning apparatus is performed according to an embodiment of the present invention.

Since the positioning part 432 is not aligned with the wide edge 430 of the scanning window 43, the interference between the reflected light beams is largely reduced during the scanning operation of the scanning module 42 is performed. In this situation, the sensing voltage become stable and the transition region becomes flat (see the circled region 51 as shown in FIG. 5). As a consequence, the data for color level calibration are more sufficient (see the circled zone 52 as shown in FIG. 5). Since the accuracy of the color level calibration is increased, the imaging quality of the scanned image is enhanced.

In accordance with the present invention, since the transition region is flat and the data for color level calibration are more sufficient, the width of the calibrating and positioning structure 43 may be reduced when compared with the prior art. In other words, the scanning apparatus of the present invention has many benefits, for example miniaturization, good imaging quality and cost-effectiveness.

Figure 6:
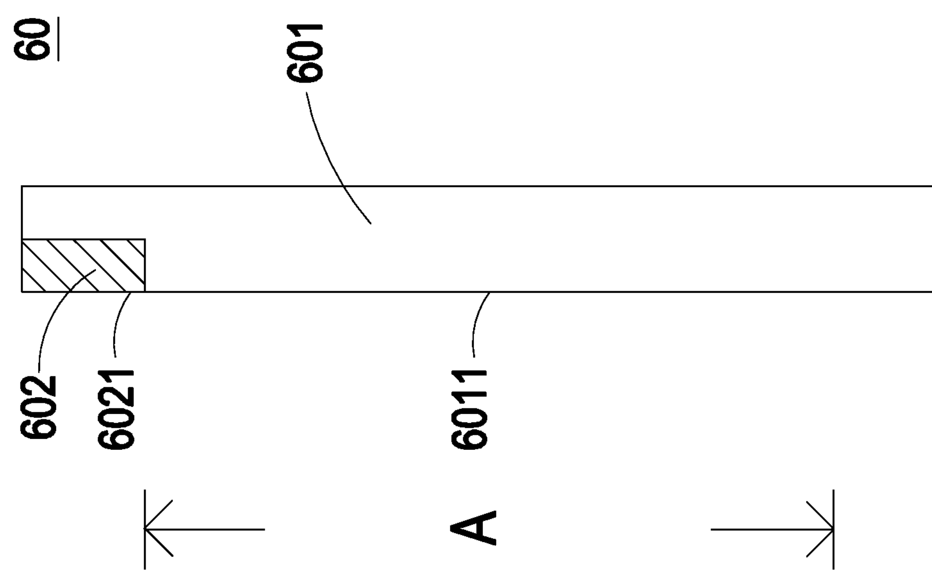
FIG. 6 is a schematic view illustrating a calibrating and positioning structure of a scanning apparatus according to another embodiment of the present invention.

FIG. 6 is a schematic view illustrating a calibrating and positioning structure of a scanning apparatus according to another embodiment of the present invention. In this embodiment, the calibrating and positioning structure 60 comprises a calibrating part 601 and a single positioning part 602. The positioning part 602 is arranged at an end of the calibrating part 601 and partially overlapped with the calibrating part 601. A first edge 6021 of the positioning part 602 and a first edge 6011 of the calibrating part 601 are arranged in the same line. In addition, the calibrating part 601 is arranged beside and aligned with the wide edge 410 of the scanning window 41, but the positioning part 602 is not aligned with the wide edge 410 of the scanning window 41. When the scanning operation of the scanning module 42 is performed, the starting position of the scanning range will be judged according to the abrupt change of the sensing voltage. The functions and configurations of the calibrating part 601 and the positioning part 602 are similar to those shown in FIG. 4B, and are not redundantly described herein.

In the above embodiments, the calibrating and positioning structure of the present invention may be applied to a scanning apparatus such as a multifunction peripheral or an image scanner. The calibrating and positioning structure comprises a calibrating part and at least one positioning part. The calibrating part is arranged beside and aligned with a wide edge of the scanning window, but the positioning part is not aligned with the wide edge of the scanning window. For performing a position-calibrating operation of the scanning module, the scanning module is firstly moved to the position corresponding to the calibrating part to perform color level calibration. As the scanning module is continuously moved to the junction between the calibrating part and the positioning part, obvious color contrast between the calibrating part and the positioning part causes an abrupt change of a sensing voltage. According to the abrupt change of the sensing voltage, the starting position of the scanning range is determined. Since the positioning part is not aligned with the wide edge of the scanning window, the interference between the reflected light beams is largely reduced during the scanning operation of the scanning module is performed. In this situation, the accuracy of the color level calibration is increased, and the imaging quality of the scanned image is enhanced. In other words, the scanning apparatus of the present invention has many benefits, for example miniaturization, good imaging quality and cost-effectiveness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A calibrating and positioning structure of a scanning apparatus, said scanning apparatus comprising a scanning platform, a scanning window and a scanning module for scanning a document placed on said scanning window, said scanning window having a wide edge and a length edge, said length edge having an extending line extending outwardly and parallel to a scanning direction of said scanning module, said calibrating and positioning structure comprising:

a calibrating part disposed on said scanning platform, and aligned with said wide edge of said scanning window; and at least one positioning part partially overlapped with said calibrating part, wherein said positioning part is not aligned with said wide edge of said scanning window, said positioning part and said scanning window are arranged on two opposite sides of said extending line.

2. The calibrating and positioning structure according to claim 1 wherein said scanning module further comprising a light-emitting element and an image reader.

3. The calibrating and positioning structure according to claim 2 wherein said image reader is a contact image sensor or a charge coupled device.

4. The calibrating and positioning structure according to claim 1 wherein said calibrating part and said at least one positioning part are different color plates with strong color contrast.

5. The calibrating and positioning structure according to claim 4 wherein when said scanning module is moved across a junction between said calibrating part and said at least one positioning part, an abrupt change of a sensing voltage occurs, wherein a starting position of a scanning range of said scanning module is determined according to said abrupt change of said sensing voltage.

6. The calibrating and positioning structure according to claim 4 wherein said calibrating part and said at least one positioning part are respectively a white calibration plate and a black calibration plate.

7. The calibrating and positioning structure according to claim 1 wherein said calibrating part has a first edge beside said wide edge of said scanning window, and said first edge of said calibrating part and a first edge of said positioning part are arranged in the same line.

8. The calibrating and positioning structure according to claim 1 wherein said calibrating and positioning structure comprises two positioning parts, which are respectively arranged at both ends of said calibrating part.

9. The calibrating and positioning structure according to claim 8 wherein a distance between said two positioning parts is equal to a width of said wide edge of said scanning window.

10. The calibrating and positioning structure according to claim 1 wherein said calibrating and positioning structure comprises one positioning part, which is arranged at an end of said calibrating part.

11. A scanning apparatus, comprising:

a scanning platform;

a scanning window having a wide edge and a length edge;

a scanning module for scanning a document, which is placed on said scanning window, said length edge having an extending line extending outwardly and parallel to a scanning direction of said scanning module; and a calibrating and positioning structure comprising a calibrating part and at least one positioning part, wherein said calibrating part disposed on said scanning platform and aligned with said wide edge of said scanning window, wherein said positioning part is partially overlapped with said calibrating part, but not aligned with said wide edge of said scanning window, and said positioning part and said scanning window are arranged on two opposite sides of said extending line.

12. The scanning apparatus according to claim 11 wherein said calibrating part and said at least one positioning part are different color plates with strong color contrast.

13. The scanning apparatus according to claim 12 wherein when said scanning module is moved across a junction between said calibrating part and said at least one positioning part, an abrupt change of a sensing voltage occurs, wherein a starting position of a scanning range of said scanning module is determined according to said abrupt change of said sensing voltage.

14. The scanning apparatus according to claim 11 wherein said calibrating part has a first edge beside said wide edge of said scanning window, and said first edge of said calibrating part and a first edge of said positioning part are arranged in the same line.

15. The scanning apparatus according to claim 11 wherein said calibrating and positioning structure comprises two positioning parts, which are respectively arranged at both ends of said calibrating part.

16. The scanning apparatus according to claim 15 wherein a distance between said two positioning parts is equal to a width of said wide edge of said scanning window.

17. The scanning apparatus according to claim 11 wherein said calibrating and positioning structure comprises one positioning part, which is arranged at an end of said calibrating part.

* * * * *